United States Patent
Taubman

(10) Patent No.: US 7,030,917 B2
(45) Date of Patent: Apr. 18, 2006

(54) IMAGE DEMOSAICING AND ENHANCEMENT SYSTEM

(75) Inventor: David S. Taubman, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/177,729

(22) Filed: Oct. 23, 1998

(65) Prior Publication Data

US 2003/0197796 A1   Oct. 23, 2003

(51) Int. Cl.
H04N 3/335 (2006.01)
H04N 1/46 (2006.01)
G06K 9/00 (2006.01)
G06K 9/32 (2006.01)

(52) U.S. Cl. .............. 348/273; 348/280; 358/518; 382/162; 382/300

(58) Field of Classification Search ............ 348/277, 348/280, 272, 273; 382/162, 167; 358/518
See application file for complete search history.

(56) References Cited

U.S. PATENT DOCUMENTS

| | | | | |
|---|---|---|---|---|
| 4,653,013 A | * | 3/1987 | Collins et al. ............. | 345/667 |
| 5,083,150 A | * | 1/1992 | Nagasaki et al. .......... | 396/49 |
| 5,170,202 A | * | 12/1992 | Bell ......................... | 396/80 |
| 5,461,503 A | * | 10/1995 | Deffontaines et al. ..... | 349/109 |
| 5,475,769 A | | 12/1995 | Wober et al. ............. | 382/167 |
| 5,489,939 A | * | 2/1996 | Haruki et al. ............. | 348/223.1 |
| 5,530,474 A | * | 6/1996 | Takei ........................ | 348/224.1 |
| 5,652,621 A | * | 7/1997 | Adams et al. .............. | 348/272 |

(Continued)

FOREIGN PATENT DOCUMENTS

EP   0 930 789 A2   7/1999

OTHER PUBLICATIONS

Parulski et al, A Digital Color CCD Imaging System Using Custom VLSI Circuits, Aug., 1989, IEEE Transactions on Consum Electronics, vol. 35, No. 3, pp. 382-388.*

(Continued)

*Primary Examiner*—David Ometz
*Assistant Examiner*—Nhan T. Tran

(57) ABSTRACT

A method for operating a data processing system to generate a second image from a first image. The first image includes a two dimensional array of pixel values, each pixel value corresponding to the light intensity in one of a plurality of spectral bands at a location in the first image. The method utilizes a linear transformation of a vector derived from super input pixels to obtain a vector that includes at least one super output pixel. The super input pixels are defined by separating the pixels of the first image into a plurality of input image planes having identical numbers of pixels corresponding to the same spectral band. Each super input pixel is a vector of dimension P, where P is the number of the input image planes. Similarly, a set of output image planes is defined, each pixel in a given output image plane representing the intensity of the second image in one of a plurality of spectral bands at a corresponding point in the second image. Each super output pixel is a vector of dimension Q, where Q is the number of the output image planes, each component of that vector being a pixel from a corresponding output image plane. In the preferred embodiment of the present invention, the linear transformation depends on the properties of the optical system and the illumination source used to generate the first image.

23 Claims, 2 Drawing Sheets

U.S. PATENT DOCUMENTS

| | | | |
|---|---|---|---|
| 5,778,106 A * | 7/1998 | Juenger et al. | 382/275 |
| 5,805,213 A * | 9/1998 | Spaulding et al. | 348/222.1 |
| 5,905,530 A * | 5/1999 | Yokota et al. | 348/241 |
| 5,990,950 A * | 11/1999 | Addison | 348/273 |
| 6,044,177 A * | 3/2000 | Herley | 382/233 |
| 6,046,772 A * | 4/2000 | Howell | 348/273 |
| 6,236,433 B1 * | 5/2001 | Acharya et al. | 348/273 |
| 6,256,058 B1 * | 7/2001 | Kang et al. | 348/207.99 |
| 6,330,085 B1 * | 12/2001 | Yamamoto et al. | 358/538 |
| 6,348,929 B1 * | 2/2002 | Acharya et al. | 345/660 |
| 6,366,319 B1 * | 4/2002 | Bills | 348/273 |
| 6,392,699 B1 * | 5/2002 | Acharya | 348/273 |
| 6,411,331 B1 * | 6/2002 | Sansom-Wai et al. | 348/223.1 |
| 6,466,702 B1 * | 10/2002 | Atkins et al. | 382/300 |
| 2002/0149686 A1 * | 10/2002 | Taubman | 348/272 |

OTHER PUBLICATIONS

European Search Report, Application No. EP 99 30 7738, dated Feb. 14, 2001.

* cited by examiner

IMAGE DEMOSAICING AND ENHANCEMENT SYSTEM

FIELD OF THE INVENTION

The present invention relates to digital cameras, and more particularly, to an improved method for converting data from a camera sensor to a color image.

BACKGROUND OF THE INVENTION

A digital color image usually consists of an array of pixel values representing the intensity of the image at each point on a regular grid. Typically, three colors are used to generate the image. At each point on the grid the intensity of each of these colors is specified, thereby specifying both the intensity and color of the image at that grid point.

Conventional color photography records the relevant image data by utilizing three overlapping color sensing layers having sensitivities in different regions of the spectrum (usually red, green, and blue). Digital cameras, in contrast, typically utilize one array of sensors in a single "layer".

When only one sensor array is used to detect color images, only one color may be detected at any given sensor location. As a result, these sensors do not produce a color image in the traditional sense, but rather a collection of individual color samples, which depend upon the assignment of color filters to individual sensors. This assignment is referred to as the color filter array (CFA) or the color mosaic pattern. To produce a true color image, with a full set of color samples (usually red, green and blue) at each sampling location, a substantial amount of computation is required to estimate the missing information, since only a single color was originally sensed at each location in the array. This operation is typically referred to as "demosaicing".

To generate the missing information, information from neighboring pixels in the image sensor must be used. A number of algorithms have been put forward in an attempt to provide the missing information while minimizing artifacts resulting from the estimation process. The simplest algorithms interpolate the sensor data from like color sensors to provide the missing information. These algorithms treat the red sensors as being independent from the green sensors, and so on. To provide a red value at a given location, the values measured by the red sensors in the region of that location are interpolated. This approach requires that the image be low-pass filtered. Such filtering reduces the image resolution below the pixel resolution of the underlying sensor array. This lost resolution cannot be recovered.

To avoid this loss in resolution, less aggressive optical low-pass filtering is used in some higher-end cameras. However, in such systems, the color sensors may no longer be treated as independent. For example, Wober, et al. (U.S. Pat. No. 5,475,769) describe a method for generating the missing color information by computing a weighted average of the pixel values in the neighborhood of the pixel whose missing color information is being computed. This method weights values from all of the color sensors, not just the color being reconstructed. However, even this approach leaves much to be desired since it utilizes one set of weights for all images.

A single pixel array may be viewed as consisting of a number of separate planes of pixels in which each plane has sensors for the same color. Since the pixels do not overlay, the sensors in the various planes are at different locations. Systems that take weighted averages across more than one plane make use of the statistical dependencies between these sample locations. In effect, the blurring of an image by the camera optics allows an image edge that falls on one color plane precisely on the sensors of that plane to also be seen in the other color planes because the image is spread by blurring onto the sensors in the other color plane. Since the statistical dependencies between the various color planes depend on the amount of blur introduced by the camera optics, an optimal algorithm must take into account the physical camera settings. Accordingly, a single set of weight functions will not provide an optimal estimation of the missing information.

The statistical dependencies also depend on the source of illumination. Different illumination sources have different spectra. The pixel filters have broad pass-bands centered at the red, green, and blue wavelengths. In the absence of any image blurring, the response of any given pixel is determined by its color filter, the reflectivity of the corresponding point in the scene being photographed, and the light spectrum incident on that point from the illumination source. The blurring provided by the camera optics mixes the light between the pixels. Hence, the statistical dependencies, in general, depend both on the illumination source and the camera optics. Prior art methods for converting the pixel array data to a fully sampled color digital image do not take the illumination source into account.

Broadly, it is the object of the present invention to provide an improved image processing method for converting data from a pixel array having non-overlapping sensors to a fully sampled digital image.

It is a further object of the present invention to provide a conversion method that corrects for the camera's optical system.

It is a still further object of the present invention to provide a conversion method that corrects for the source of illumination.

These and other objects of the present invention will become apparent to those skilled in the art from the following detailed description of the invention and the accompanying drawings.

DETAILED DESCRIPTION OF THE INVENTION

The method of the present invention may be applied to any color-sampling device that acquires its samples from a sensor array that can be decomposed into a plurality of image planes, which satisfy two conditions. First, each image plane must have an identical number of samples within a normalized horizontal and vertical sampling interval; however, the various image planes may be arbitrarily displaced relative to one another. Second, all samples in a given image plane must have identical color properties; however, multiple image planes can have the same color properties.

Figure 1:
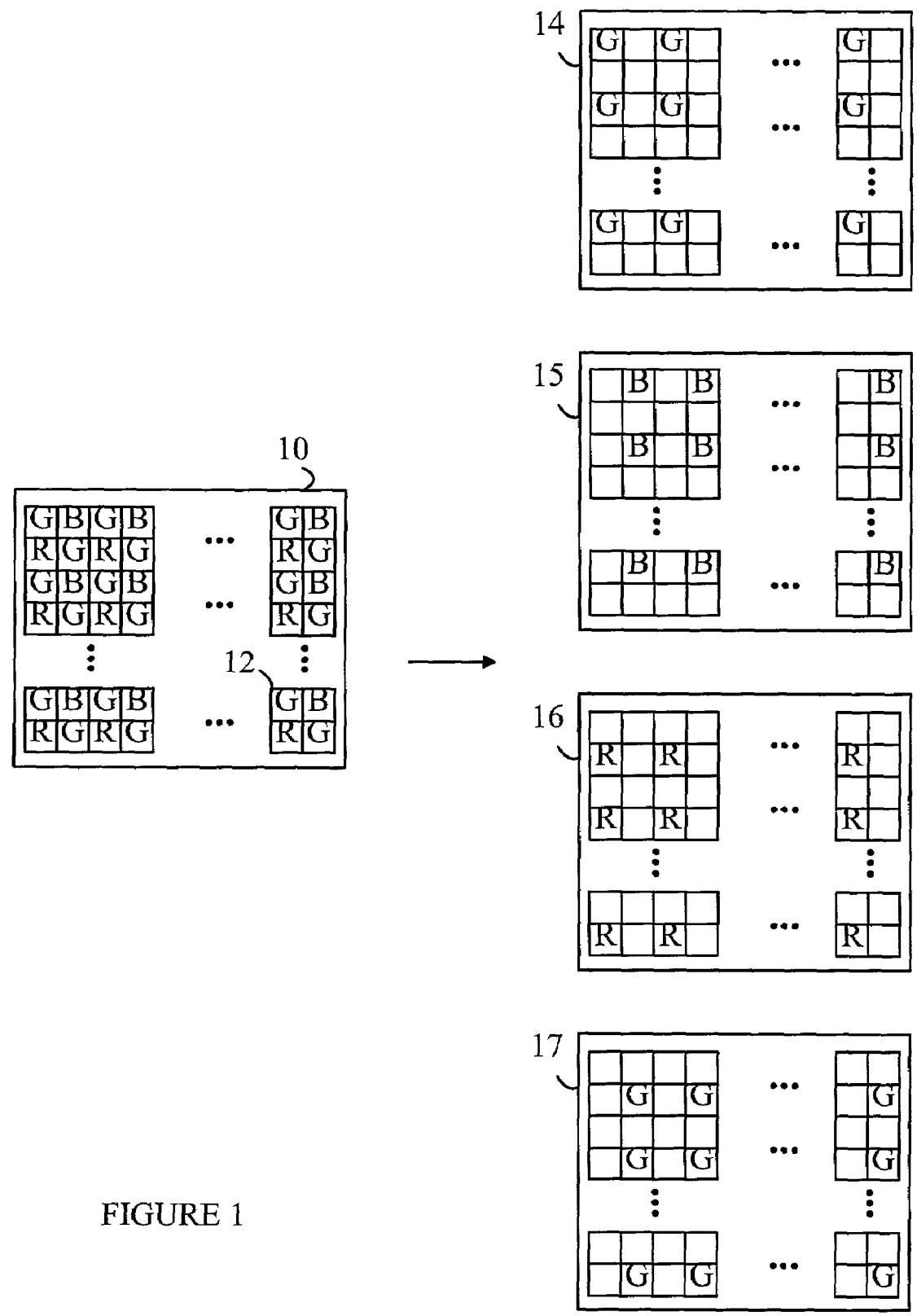
FIG. 1 illustrates the separation of an image taken with an image sensor having a repeating 2×2 pattern into image planes according to the present invention.

These conditions are satisfied by any image sensor having a sensor pattern that is constructed by repeating a kernel of sensing elements. For example, one common image sensor array is based on the Bayer pattern, which is generated by repeating a 2×2 sensor array kernel having two green sensors, one red sensor, and one blue sensor. This pattern is shown in FIG. 1 at 10. The kernel is shown at 12. Such an image sensor may be viewed as having four planes shown at 14–17: two green planes 14 and 17, one red plane 16, and one blue plane 15. The sampling interval is the area originally occupied by the kernel. Each of the planes is offset with respect to the other planes. It can be shown that any regular sampling lattice can be decomposed into a set of image planes satisfying the above conditions.

To simplify the following discussion, vector notation will be utilized. Vectors and matrices will be shown in bold print to distinguish them from scalar quantities. The measured intensity values in each image plane will be denoted by $x_p[n_1,n_2]$. Here, $n_1$ and $n_2$ are indicies which denote the position of the pixel in the $p^{th}$ image plane and $x_p$ is the intensity value measured for that pixel. The quantity $[n_1,n_2]$ is a two-dimensional integer valued vector which will be denoted by n. The entire set of image planes can then be represented as a set of vectors x[n] where $$x[n] = \begin{bmatrix} x_1[n_1, n_2] \\ x_2[n_1, n_2] \\ \vdots \\ x_P[n_1, n_2] \end{bmatrix} \quad (1)$$

The output image can likewise be represented as a set of vectors defined on a different set of image planes. Typically, the goal of the demosaicing algorithm is to generate a set of regularly spaced pixels in three color planes (red, green, and blue). Denote the intensity in the $i^{th}$ color plane by $y_i[n_1,n_2]$. Then the output pixels can also be represented by a set of vectors.

$$y[m] = \begin{bmatrix} y_1[m_1, m_2] \\ y_2[m_1, m_2] \\ \vdots \\ y_Q[m_1, m_2] \end{bmatrix} \quad (2)$$

In the demosaicing case, Q is typically 3; however, different Q values may be utilized. For example, an image that is to be printed on a color printer utilizing 4 dyes could be generated directly by the method of the present invention utilizing a representation in which Q=4.

In general, the output image will have a spatial resolution that is different from the input image. The input image may be viewed as consisting of a set of "super pixels", x[n]. Likewise, the output image is a set of pixels y[m]. The number of output pixels in the vertical and horizontal directions corresponding to each input pixel will be denoted by $\lambda_1$ and $\lambda_2$, respectively. In the case of the Bayer pattern discussed above, the demosaicing task is usually understood as having $\lambda_1=\lambda_2=2$. That is, one attempts to construct one output (RGB) pixel for each physical sensor in the input array.

In the method of the present invention, the output pixels are related to the input pixels by a linear operator that operates on vectors derived from x[n] and y[m]. These intermediate vectors take into account the difference in resolution and the fact that each output pixel depends on more than one input super pixel. The intermediate vector corresponding to y[m] will be denoted by $\zeta[n]$ and has the same sampling density as x[n]:

$$\varsigma[n] = \begin{bmatrix} y[\Lambda(n + \delta_1)] \\ y[\Lambda(n + \delta_2)] \\ \vdots \\ y[\Lambda(n + \delta_{\lambda_1 \lambda_2})] \end{bmatrix} \quad (3)$$

Here, the matrix $\Lambda$ is defined by $$\Lambda = \begin{bmatrix} \lambda_1 & 0 \\ 0 & \lambda_2 \end{bmatrix} \quad (4)$$

In the case of the Bayer pattern, $\delta_1=[0,0]$, $\delta_1=[\frac{1}{2},0]$, $\delta_1=[0,\frac{1}{2}]$, and $\delta_1=[\frac{1}{2},\frac{1}{2}]$. The vectors $\zeta[n]$ will be referred to as the output polyphase components in the following discussion.

In the method of the present invention, it is assumed that each polyphase output vector depends on a finite number of input super pixels. In general, the input super pixels that contribute to a particular polyphase output vector $\xi[n]$ will be located in a neighborhood around [n]. As will be explained in more detail below, the precise pixels will depend on the nature of the camera and imaging optics. The input super pixels that contribute to the polyphase output vector at [n] may be identified by a set of displacement vectors $k_1, k_2, \ldots, k_K$. That is, $\xi[n]$ depends on $x[n+k_1]$, $x[n+k_2], \ldots, x[n+k_K]$. In the method of the present invention, $\xi[n]$ is assumed to be linearly dependent on the input super pixels. In the preferred embodiment of the present invention, the set of displacement vectors $k_1, k_2, \ldots, k_K$ is independent of [n], and is arranged in a $k_1 \times k_2$ rectangular grid.

The linear relationship can be most easily defined in terms of a vector $\xi[n]$ which includes all of the super pixels on which the output polyphase vector $\zeta[n]$ depends, i.e., $$\xi[n] = \begin{bmatrix} x[n + k_1] \\ \vdots \\ x[n + k_K] \end{bmatrix} \quad (5)$$

In terms of this vector, the relationship between $\zeta[n]$ and $\xi[n]$ may be written as matrix multiplication:

$$\zeta[n] = T\xi[n] \quad (6)$$

where T is a $(Q\lambda_1\lambda_2) \times (PK_1PK_2)$ matrix.

Figure 2:
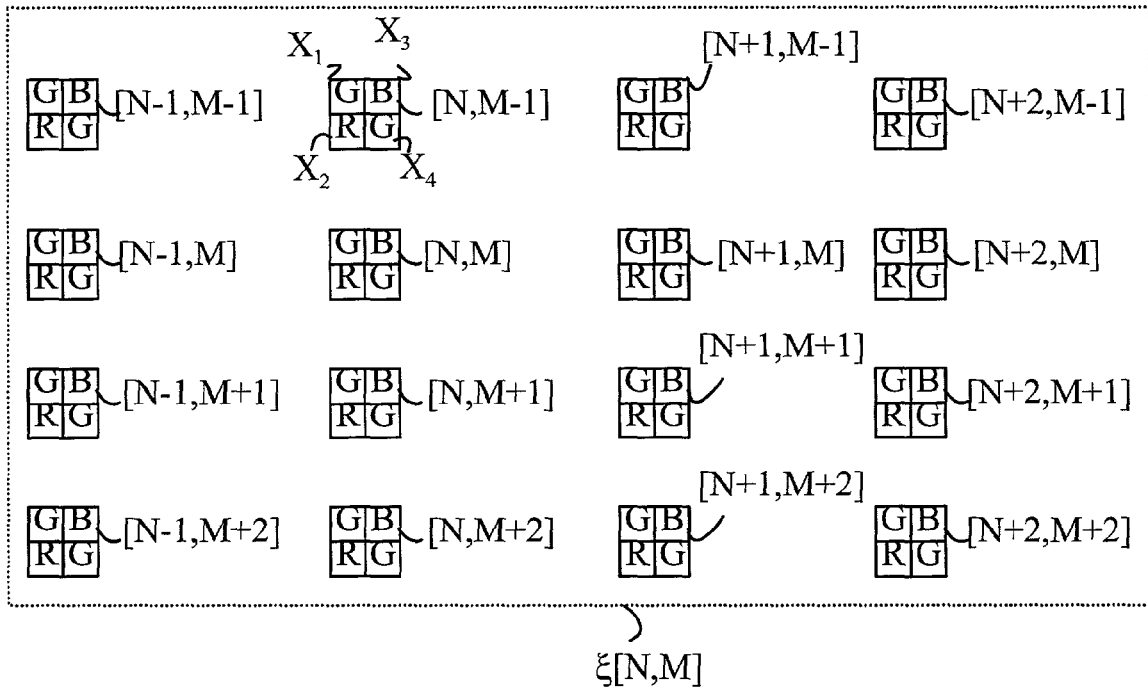
FIG. 2 illustrates a portion of a sensor array and the input pixels in the sensor array which contribute to a particular intermediate input vector.
Figure 3:
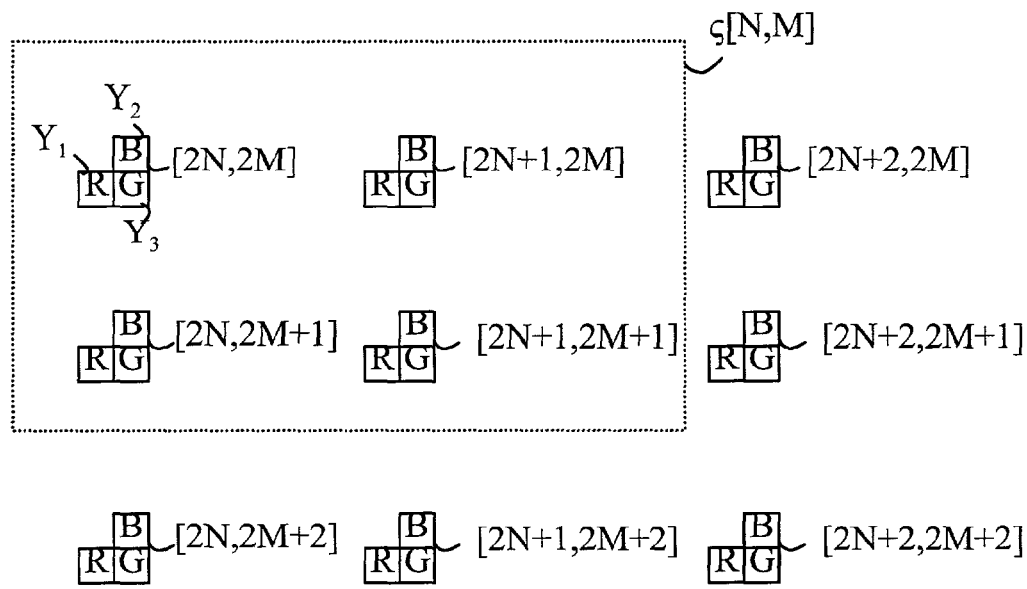
FIG. 3 illustrates a portion of an output RGB (red, green, blue) image and the pixels in the RGB output image that correspond to the intermediate output vector shown in FIG. 2.

Refer now to FIGS. 2 and 3 which illustrate the relationships between the output pixels $Y_j[N,M]$, the input pixels $x_i[N,M]$ and the two intermediate vectors defined above for the Bayer sensor pattern. FIG. 2 illustrates a portion of a sensor array and the input pixels in the sensor array which contribute to $\xi[N,M]$. FIG. 3 illustrates a portion of an output RGB image and the pixels in the RGB output image that correspond to ζ[N,M] and which are computed from the pixels shown in FIG. 2 by the matrix multiplication operation shown in Eq. (6).

The matrix, T, depends on a number of factors. Some of these are fixed for a particular imaging device and some depend on the particular manner in which the imaging device is being utilized. For example, the physical properties of the sensing array such as the spectral sensitivity of the pixels, the mosaic pattern, and the number of pixels typically do not vary from image to image. In contrast, the optical properties of the imaging device such as the lens settings on a camera (f number and zoom) may vary from image to image. In addition, the spectral properties of the illumination source may vary from image to image (daylight, flash, incandescent light, etc.).

In addition, the statistics of the image being captured may be taken into account through T. For example, images or portions of images having a high content of vertical and horizontal edges can be processed with a different matrix than images lacking such features and thereby improve the output image quality.

In cameras that have a variable output format, the resolution of the final picture can be set using a different T matrix. Alternatively, a single T matrix may be utilized for all resolutions and then the desired output image determined by re-sampling the fixed resolution image. Similarly, the number of output color planes may be altered by using different T matrices or by resampling a single color format to generate an alternate color representation. In general, properties that alter the dimension of the T matrix are preferably handled by using a fixed T matrix and then re-sampling the final image in low cost imaging devices.

If the number of different T matrices is relatively small, the coefficients of the T matrix can be determined by training the system on known images. For each possible T matrix, images of a number of known scenes are taken using the imaging device. The coefficients of the T matrix are then computed so as to minimize the difference between the image computed from the sensor input and the known scene images. Such optimization computations are well known to those skilled in the art, and hence, will not be discussed in detail here.

If the variation in some parameter such as f-number is relatively smooth, the T matrices need only be computed for a discrete number of values of the parameter. The correct T matrix for the non-computed variable parameter values can then be computed by interpolation of the computed T matrices.

Model-Based Computation of T

As noted previously, in some circumstances it may be possible to compute appropriate matrices, T, from training images. Unfortunately, this approach is limited to applications in which the number of different imaging conditions and hence the number of different T matrices which could be required is relatively small. The purpose of the material presented here is to describe a method for directly computing T for an arbitrary imaging device (i.e. arbitrary color sensitivities, sensor locations and optical characteristics) and under arbitrary illumination, subject to a particular statistical model for the underlying image, which has been found to give particularly good re-constructed image quality. As will be seen, the statistical image model is governed by only a few parameters. In more advanced applications, these parameters may be adjusted, either locally, or globally, to match statistical properties of the image, such as edge orientation, which can be estimated by various methods.

Image Formation Model

This section describes the parameters of the image formation process which maps the original scene into the source image super-pixels, x[n]. The image formation model depends upon deterministic quantities which can, at least in theory, be measured. These quantities are The scene illuminant spectral power density, $l(\lambda)$.

The color spectral response functions, $r_p(\lambda)$, for each input image plane, p.

The Point Spread Function, $h_p(\lambda,s)$, associated with the combined effects of the optical transfer function and sensor integration behaviour for input image plane p. Here $s=[s_1,s_2]$ is the spatially continuous argument of the Point Spread Function (PSF), at each wavelength, $\lambda$. Note that the PSF's implicitly include the effect of relative displacements between the different input image planes. In the following, the PSF is referenced only through its Fourier Transform, $\hat{h}_p(\lambda,\omega)$, where the spatial frequency vector, $\omega=[\omega_1,\omega_2]$, is normalized so that $\omega_1=\omega_2=\pi$ at the Nyquist frequency of the input super-pixels. Thus, the Nyquist frequency of the original sensor array corresponds to $\omega=[\lambda_1\pi,\lambda_2\pi]$.

Rather than modeling the image formation process directly in terms of the desired out-put image super-pixels, it is helpful to choose an intermediate representation in terms of surface spectral-reflectance, since this is well known to be better behaved from a statistical perspective than the scene radiance itself and hence more amenable to the statistical modelling described in the next section. Specifically it is helpful to assume that the spectral reflectance of the original scene can be perfectly represented as a linear combination of a limited number of fixed basis functions, $b1(\lambda), b_2(\lambda), \ldots, b_S(\lambda)$, where S is usually chosen to be three or four, but may be larger if desired. The actual output vectors, y[m], may be expressed in terms of the intermediate spectral reflectance vectors, z[m] as $$y[m] = T_{out} \cdot z[m]$$

$$= \begin{pmatrix} \int_0^\infty d_1(\lambda)l(\lambda)b_1(\lambda)d\lambda & \int_0^\infty d_1(\lambda)l(\lambda)b_2(\lambda)d\lambda & \cdots & \int_0^\infty d_1(\lambda)l(\lambda)b_S(\lambda)d\lambda \\ \int_0^\infty d_2(\lambda)l(\lambda)b_1(\lambda)d\lambda & \int_0^\infty d_2(\lambda)l(\lambda)b_2(\lambda)d\lambda & \cdots & \int_0^\infty d_2(\lambda)l(\lambda)b_S(\lambda)d\lambda \\ \vdots & \vdots & \ddots & \vdots \\ \int_0^\infty d_Q(\lambda)l(\lambda)b_1(\lambda)d\lambda & \int_0^\infty d_Q(\lambda)l(\lambda)b_2(\lambda)d\lambda & \cdots & \int_0^\infty d_Q(\lambda)l(\lambda)b_S(\lambda)d\lambda \end{pmatrix} \cdot z[m]$$

where $d_q(\lambda)$ is the spectral response of the q'th display spectral response function. For example, if the objective is to recover an XYZ image, then Q should be set to 3 and $d_1(\lambda)$ through $d_3(\lambda)$ should be set to the standard 1931 CIE tri-stimulus functions. As another example, if the objective is to recover an image with the same color characteristics as the different color filters on the physical sensor array, then Q should be set to the number of unique input response functions, $r_p(\lambda)$, and there should be a one-to-one correspondence between these unique $r_p(\lambda)$ and the $d_q(\lambda)$. In this framework, the chief goal is to compute the $(S\lambda_1\lambda_2) \times (PK_1K_2)$ reconstruction matrix, $T_{ref}$ which maps the neighbourhood of input super-pixels, $\xi[n]$, to the corresponding spectral-reflectance super-pixel, $$\zeta'[n] = \begin{pmatrix} z[\Lambda(n+\delta_1)] \\ z[\Lambda(n+\delta_2)] \\ \vdots \\ z[\Lambda(n+\delta_{\lambda_1\lambda_2})] \end{pmatrix}$$

The final $(Q\lambda_1\lambda_2) \times (PK_1K_2)$ reconstruction matrix is then formed by simple matrix multiplication:

$$T = \begin{pmatrix} T_{out} & 0 & 0 & \cdots & 0 & 0 \\ 0 & T_{out} & 0 & \cdots & 0 & 0 \\ \vdots & & \ddots & & & \vdots \\ 0 & 0 & 0 & \cdots & 0 & T_{out} \end{pmatrix} \cdot T_{ref} \qquad (7)$$

The linear image formation model may now be expressed compactly as $$\hat{x}(\omega) = \hat{v}(\omega) + \sum_{\omega_a \in \Omega_a(\omega)} H(\omega_a)\hat{z}(\Lambda^{-1}\omega_a)$$

where
$\hat{x}(\omega)$ is the Discrete Space Fourier Transform of the input image, $x[n]$;
$\hat{v}(\omega)$ is the Discrete Space Fourier Transform of the sampling noise vector sequence;
$\hat{z}(\omega)$ is the Discrete Space Fourier Transform of the spectral reflectance vector, $z[m]$;
$\Omega_a(\omega)$, is the set containing all $\lambda_1\lambda_2$ aliasing frequencies associated with the sampling of the high resolution output image on grid $[m]$ onto the input super-pixel grid $[n]$, for each $\omega \in [-\pi,\pi]^2$; and
$H(\omega)$ is the P×S image formation matrix, $$H(\omega) = \begin{pmatrix} \int_0^\infty r_1(\lambda)l(\lambda)b_1(\lambda)\hat{h}_1(\lambda,\omega)d\lambda & \cdots & \int_0^\infty r_1(\lambda)l(\lambda)b_S(\lambda)\hat{h}_1(\lambda,\omega)d\lambda \\ \int_0^\infty r_2(\lambda)l(\lambda)b_2(\lambda)\hat{h}_2(\lambda,\omega)d\lambda & \cdots & \int_0^\infty r_2(\lambda)l(\lambda)b_S(\lambda)\hat{h}_2(\lambda,\omega)d\lambda \\ \vdots & \ddots & \vdots \\ \int_0^\infty r_P(\lambda)l(\lambda)b_1(\lambda)\hat{h}_P(\lambda,\omega)d\lambda & \cdots & \int_0^\infty r_P(\lambda)l(\lambda)b_S(\lambda)\hat{h}_P(\lambda,\omega)d\lambda \end{pmatrix}$$

Statistical Model

In order to compute an appropriate solution to the image reconstruction problem, it is necessary to introduce a statistical model for the sampling noise, $\hat{v}(\omega)$, and the spectral reflectance, $\hat{z}(\omega)$. In this discussion, Wide Sense Stationary Gaussian models are assumed, which are characterized entirely by the covariance matrices, $$C_v(\omega) = E[\hat{v}(\omega) \cdot \hat{v}(\omega)^*]$$

and $$C_z(\omega) = E[\hat{z}(\omega) \cdot \hat{z}(\omega)^*]$$

The noise covariance matrix will usually be a constant, $C_v(\omega) = \sigma^2 I$, for all $\omega$, corresponding to white noise, but other models may be used if appropriate.

The following parametric model is used for the reflectance covariance matrix, $$C_z(\omega) = C_z^0 \cdot \|\Gamma_\omega\|^{-\frac{p}{10}} \qquad (8)$$

where $C_z^0$ is a constant S×S covariance matrix, p is a frequency roll-off parameter, which is usually selected in the range 20 to 30 dB/decade, and F is a 2×2 "shape matrix". The terms in the above expression which follow the constant covariance matrix, $C_z^0$, describe a scalar envelope function whose contours are elipses in the frequency domain. The orientation and aspect ratio of these eliptic contours may be explicitly controlled by means of the $\Gamma$ matrix. For a circular cross-section, the identity matrix, $\Gamma = I$, may be used.

The statistical model represented by $C_z$ plays an extremely important role in determining the quality of the final reconstructed images. The parametric model described above may be justified on a number of grounds; most notably, the model is scale-invariant, which means that on average the statistics of scenes should not depend upon how far the camera is located from the scene. This scale-invariance property is important because in practical imaging applications, information about the absolute scale of objects in the scene is rarely available. Also, there is significant empirical evidence for this scale invariance property in natural scenes, with a frequency roll-off factor, p, of about 20 dB/decade.

Efficient Computation of T

As mentioned above, the key objective is to compute the $(S\lambda_1\lambda_2) \times (PK_1K_2)$ matrix, $T_{ref}$, from which T is easily recovered via equation (7). The ensuing discussion concerns the derivation of an optimal Linear Minimum Mean Squared Error (LMMSE) estimator, $T_{ref}$, subject to the models described in the previous two sections. The formula for such an estimator is well-known. Specifically, $$T_{ref} = Z \cdot X^{-1} \qquad (9)$$

where Z is the $(S\lambda_1\lambda_2) \times (PK_1K_2)$ cross-covariance matrix, $$Z = E[\zeta'[n] \cdot \xi[n]^t]$$

and X is the $(PK_1K_2) \times (PK_1K_2)$ dimensional auto-covariance matrix, $$X = E[\xi[n] \cdot \xi[n]^t]$$

In fact, X has the following Toeplitz block-Toeplitz structure, $$X = \begin{pmatrix} \underline{X}[0] & \underline{X}[1] & \cdots & \underline{X}[K_2-1] \\ \underline{X}[-1] & \underline{X}[0] & \cdots & \underline{X}[K_2-2] \\ \vdots & & \ddots & \vdots \\ \underline{X}[1-K_2] & \underline{X}[2-K_2] & \cdots & \underline{X}[0] \end{pmatrix}$$

where each block, $\underline{X}[l_2]$, has the Toeplitz form $$\underline{X}[l_2] = \begin{pmatrix} \underline{X}[0,l_2] & \underline{X}[1,l_2] & \cdots & \underline{X}[K_1-1,l_2] \\ \underline{X}[-1,l_2] & \underline{X}[0,l_2] & \cdots & \underline{X}[K_1-2,l_2] \\ \vdots & & \ddots & \vdots \\ \underline{X}[1-K_1,l_2] & \underline{X}[2-K_1,l_2] & \cdots & \underline{X}[0,l_2] \end{pmatrix}$$

and each sub-block, $\underline{X}[l_1,l_2]$, is a P×P source super-pixel covariance matrix, given by $$\underline{X}[l] = E[x[n] \cdot x[n+l]^t]$$

The $(S\lambda_1\lambda_2) \times (PK_1K_2)$ matrix, Z, also has a doubly-nested block structure. Specifically, where $$Z = \left( \underline{Z}\left[-\left\lfloor \frac{K_2}{2} \right\rfloor\right] \; \underline{Z}\left[1-\left\lfloor \frac{K_2}{2} \right\rfloor\right] \cdots \underline{Z}\left[\left\lfloor \frac{K_2-1}{2} \right\rfloor\right] \right)$$

where $$\underline{Z}[l_2] = \left( \underline{Z}\left[-\left\lfloor \frac{K_1}{2} \right\rfloor, l_2\right] \; \underline{Z}\left[1-\left\lfloor \frac{K_1}{2} \right\rfloor, l_2\right] \cdots \underline{Z}\left[\left\lfloor \frac{K_1-1}{2} \right\rfloor, l_2\right] \right)$$

and the $(S\lambda_1\lambda_2) \times P$ sub-block matrices, $\underline{Z}[l]$, are given by $$\underline{Z}[l] = E[\zeta'[n] \cdot \xi[n+l]^t].$$

In order to compute $T_{ref}$, then, it is sufficient to compute the matrices $\underline{X}[l]$ for $[l]=[l_1,l_2]$ in the range $-K_i < l_i < K_i$ and the matrices $\underline{Z}[l]$, for $[l]=[l_1,l_2]$ in the range $$-\left\lfloor \frac{K_i}{2} \right\rfloor \leq l_i \leq \left\lfloor \frac{K_i-1}{2} \right\rfloor,$$

after which the contents of X and Z may be filled in and used to evaluate equation (9). The key to efficient computation of $T_{ref}$ lies in efficiently computing the matrices, $\underline{X}[l]$ and $\underline{Z}[l]$.

It turns out that these matrices may be efficiently computed by exploiting Parseval's Relationship. Specifically, $$\underline{X}[-l] = \frac{1}{(2\pi)^2} \int_{-\pi}^{\pi} d\omega_1 \int_{-\pi}^{\pi} d\omega_2 e^{j\omega^t l} C_x(\omega) \tag{10}$$

and $$\underline{Z}[-l] = \frac{1}{(2\pi)^2} \int_{-\pi}^{\pi} d\omega_1 \int_{-\pi}^{\pi} d\omega_2 e^{j\omega^t l} C_{\zeta'x}(\omega) \tag{11}$$

where the frequency auto- and cross-covariance matrices, $C_x(\omega)$ and $C_{\zeta'x}(\omega)$ are found from $$C_x(\omega) = C_v(\omega) + \sum_{\omega_a \in \Omega_a(\omega)} (H(\omega_a) C_z(\omega_a) H(\omega_a)^*) \tag{12}$$

and $$C_{\zeta'x}(\omega) = \sum_{\omega_a \in \Omega_a(\omega)} (\Phi(\omega_a) C_z(\omega_a) H(\omega_a)^*) \tag{13}$$

Here, $\Phi(\omega)$ is the $(S\lambda_1\lambda_2) \times S$ matrix of phase shifts, $$\Phi(\omega) = \begin{pmatrix} e^{j\omega^t \delta_1} I^{(S)} \\ e^{j\omega^t \delta_2} I^{(S)} \\ \vdots \\ e^{j\omega^t \delta_{\lambda_1\lambda_2}} I^{(S)} \end{pmatrix}$$

corresponding to the relative dispacements of each of the output polyphase components.

In order to compute the matrices, $\underline{X}[l]$ and $\underline{Z}[l]$, $C_{\zeta'x}(\omega)$ and $C_{\zeta'x}(\omega)$ are evaluated at a finite number of frequencies, $\omega \in [-\pi,\pi]^2$ and then the Inverse Fourier Transform (IFT) integrals of equations (10) and (11) are approximated numerically. There are various approaches to determining the best set of frequency points at which to evaluate $\underline{X}[l]$ and $\underline{Z}[l]$ and interpolating between these points during the numerical integration procedure, but these are beyond the scope of this brief discussion.

Various modifications to the present invention will become apparent to those skilled in the art from the foregoing description and accompanying drawings. Accordingly, the present invention is to be limited solely by the scope of the following claims.

What is claimed is:

1. A method of processing an input digital image produced by an optical system, the input image having less than full color information at each of a plurality of pixels, the method comprising:
   accessing an operator including an array of demosaicing weights, values of the weights determined from measured parameters of the optical system and inverse equations of a model of the optical system; and
   applying the operator to the input image to produce an output image having full color information at each of a plurality of pixels.

2. The method of claim 1, wherein the operator compensates for degradation in the optical system.

3. The method of claim 1, wherein applying the operator includes forming a plurality of input vectors from the input image, each input vector formed from super pixels, and applying the operator to the input vectors.

4. The method of claim 1, wherein the operator is used for different resolutions, and a resulting fixed resolution image is resampled.

5. The method of claim 1, wherein the values of the demosaicing weights are determined to additionally compensate for image degradation.

6. The method of claim 1, wherein the operator is accessed from a plurality of different operators.

7. The method of claim 6, wherein the different operators are included in T-matrices.

8. An article for a processor, the article including computer memory encoded with instructions for causing the processor to perform the method of claim 1.

9. A digital camera including a processor programmed to perform the method of claim 1.

10. The digital camera of claim 9, further comprising memory for storing a plurality of candidate operators; and wherein the processor is programmed to access the operator by selecting the operator from one of the plurality of candidates.

11. A method of generating a linear operator for demosaicing of a digital image by a digital camera, the method comprising
accessing a parametric image capture description;
measuring parameters of the camera; and
using inverse equations of the parametric description and the measured parameters to obtain coefficients of the linear operator.

12. The method of claim 11, wherein a noise model and a linear minimization technique are used to generate the coefficients.

13. The method of claim 11, wherein the coefficients are designed to perform both demosaicing and compensation of image degradation by the digital camera.

14. The method of claim 11, wherein measuring the parameters includes measuring at least one of the following parameters:
scene illuminant spectral power density;
color spectral response function; and
point spread function.

15. The method of claim 11, wherein an $(S\lambda_1\lambda_2) \times (PK_1K_2)$ reconstruction matrix is computed from parametric description and the measured parameters, and wherein the linear operator is recovered from the reconstruction matrix.

16. The method of claim 11, wherein the parametric description includes a deterministic part and a random part.

17. The method of claim 16, wherein the deterministic part includes at least one of scene illuminant spectral power density, color spectral response function, and point spread function; and wherein the random part includes noise statistics.

18. The method of claim 11, wherein the parametric description is $$\hat{x}(\omega) = \hat{v}(\omega) + \sum_{\omega_a \in \Omega_a(\omega)} H(\omega_a)\hat{z}(\Lambda^{-1}\omega_a).$$

19. The method of claim 11, wherein the coefficients of the linear operator are obtained without the use of measured image samples.

20. The method of claim 11, wherein using the measured parameters includes inserting the measured parameters into the inverse equations to obtain the coefficients of the linear operator.

21. A computer programmed to perform the method of claim 11.

22. An article for a processor, the article including computer memory encoded with the linear operator of claim 11.

23. A digital camera including memory encoded with the linear operator of claim 11.

* * * * *

UNITED STATES PATENT AND TRADEMARK OFFICE
CERTIFICATE OF CORRECTION

| | |
|---|---|
| PATENT NO. | : 7,030,917 B2 |
| APPLICATION NO. | : 09/177729 |
| DATED | : April 18, 2006 |
| INVENTOR(S) | : David S. Taubman |

Page 1 of 1

It is certified that error appears in the above-identified patent and that said Letters Patent is hereby corrected as shown below:

Title Pg, Item (75), in "Inventors", delete "Redwood City, CA (US)" and insert -- Pymble, NSW 2073 AU --, therefor.

Signed and Sealed this

Sixteenth Day of February, 2010

David J. Kappos
*Director of the United States Patent and Trademark Office*